United States Patent [19]

Filing et al.

[11] Patent Number: 5,717,167
[45] Date of Patent: Feb. 10, 1998

[54] DEVICE AND METHOD FOR WEIGHING SOLID WASTE WITH AN ANGLE-CORRECTION SCALE

[75] Inventors: Kenneth J. Filing, Akron; Brian K. Smith, Windham, both of Ohio; Danny R. Barger, Riverside, Calif.

[73] Assignee: LTS Scale Corp., Twinsburg, Ohio

[21] Appl. No.: 377,716

[22] Filed: Jan. 24, 1995

[51] Int. Cl.$^6$ ............................. G01G 19/08; G01G 19/22
[52] U.S. Cl. ................... 177/136; 177/25.11; 177/25.13
[58] Field of Search ............................. 177/136, 139, 177/141, 25.11, 25.12, 25.13, 25.14

[56] References Cited

U.S. PATENT DOCUMENTS

| | | | |
|---|---|---|---|
| 4,421,186 | 12/1983 | Bradley | 177/139 |
| 4,627,013 | 12/1986 | Ichiyama et al. | 364/567 |
| 4,638,876 | 1/1987 | Balduin et al. | 177/139 |
| 4,645,018 | 2/1987 | Garbade et al. | 177/6 |
| 4,666,004 | 5/1987 | Raz | 177/139 |
| 4,691,792 | 9/1987 | Shintani | 177/1 |
| 5,004,392 | 4/1991 | Naab | 414/21 |
| 5,119,894 | 6/1992 | Crawford et al. | 177/145 |
| 5,161,628 | 11/1992 | Wirth | 177/137 |
| 5,178,226 | 1/1993 | Bowman et al. | 177/139 |
| 5,209,312 | 5/1993 | Jensen | 177/136 |
| 5,393,936 | 2/1995 | Tyhy et al. | 177/138 |

Primary Examiner—Michael L. Gellner
Assistant Examiner—Randy W. Gibson
Attorney, Agent, or Firm—Renner, Kenner, Greive, Bobak, Taylor & Weber

[57] ABSTRACT

A device (10) for correcting for the out-of-level condition of a weighing apparatus (20), which includes a scale (22) and a clinometer (24) to provide an accurate weight measurement of a load disposed thereon whenever the tilt of the scale (22) is within preselected out-of-level angles. The device (10) is configured such that the scale (22) and the clinometer (24) provide respective analog weight (23) and angle (60) signals to an analog-to-digital ratiometric converter (70) which generates a proportional digital output signal (72) to a microcomputer (40) for storing the weight in memory (42) and visually displaying the weight on a weight display (48). The device (10) also provides a method for correcting the angle of a weighing apparatus (20) which includes providing a vehicle (12) with a scale (22) mounted thereon, monitoring the weight of any object disposed on the scale (22) and providing a weight signal (23) proportional thereto, monitoring the angle of the scale (22) and providing an angle signal (60) proportional thereto, conditioning the angle signal (60), converting the weight signal (23) and angle signal (60) to an output signal (72), and displaying and storing the output signal (72).

16 Claims, 2 Drawing Sheets

DEVICE AND METHOD FOR WEIGHING SOLID WASTE WITH AN ANGLE-CORRECTION SCALE

TECHNICAL FIELD

The present invention relates generally to a device and method for weighing solid waste from a scale carried on a residential solid waste truck. More particularly, the invention relates to electronic instrumentation and method of operation for accurately weighing solid waste when a solid waste truck and scale are out of level. Specifically, the present invention relates to an electronically-activated scale in which the weight disposed on the scale is monitored, and the measured value is adjusted depending upon how far out of level the scale is so as to provide an accurate weight measurement of the subject load and generate a corresponding visual display.

BACKGROUND ART

It is well known in the art to provide weighing devices or scales carried on vehicles, such as fork lifts and pallet trucks. However, there is not currently available a weighing device or scale having the operating characteristics to provide on-site weighing of solid waste immediately prior to its transfer into a waste hauling vehicle when the vehicle is out of level. Normally, when the waste hauling vehicle is out of level, an accurate weight cannot be ascertained. This is because solid waste that is weighed on an out-of-level scale provides a shear force with both vertical and horizontal components. Since the horizontal shear force is not accounted for by current scales, an inaccurate weight of the solid waste results. As such, there is a need for a scale carried on a solid waste disposal truck that is capable of weighing loads when the truck and/or scale is out of level.

Current vehicular weighing devices are advantageous in that they eliminate the need to transfer the object to be weighed from the vehicle to a scale and then back to the vehicle. Typically, these current vehicular weighing devices consist of load cells or sensors strategically placed on or within the tines of a fork member. Furthermore, the sensors are in communication with strain gages to sense the weight of items carried on the forks. However, current vehicular weighing devices operate such that the strain gages are positioned on the load sensors so that only vertical shear or bending forces are detected. As such, any non-vertical (out-of-level) loading is rejected and not measured by the scale.

Therefore, the need for a scale carried on a solid waste disposal truck that is capable of measuring the weight of out-of-level loads has arisen. This need is primarily attributable to heightened environmental concerns about the content and amount of trash disposed in landfills. Local governments, in response to increased costs of using landfill space, are exploring various ways to effectively control the flow of solid waste to the landfills. For example, local governments encourage the recycling of newspapers, glass, aluminum, metal, and plastic. Recycling saves energy and reduces the amount of landfill space required. Additionally, to further reduce the flow of solid waste into landfills and to equitably charge those who generate the most solid waste, local governments desire a facile means to weigh and account for the amount of waste generated by each resident. Instead of charging a flat fee for solid waste collection, local governments could accurately assess citizens for the amount of waste they generate. Thus, those citizens who generate large amounts of waste would have an economic incentive to reduce the amount of solid waste they generate.

By compensating for the horizontal shear forces not accounted for by the tilting of the waste hauling vehicle, the present invention provides an accurate on-board weighing device. The accuracy of the on-board weighing device is assisted by receiving input from orthogonal axes of the scale so that tilted or off-center weight displacement can be accounted for. In other words, loads that are unevenly distributed tend to tilt the weighing device away from a level condition. By further considering the horizontal and vertical shear forces of the load along two axes, a more accurate weight measurement can be obtained. Furthermore, a method of tilt compensation or angle correction may be implemented with a microcomputer-based circuit, thus avoiding the difficulties that can plague scales with mechanical angle correction. Use of a microcomputer-based control circuit also allows for easy determination of the tare weight (container weight) which can be deducted from the gross weight to provide the net weight. If desired, measurement data for each load can be stored for later retrieval by a host computer.

DISCLOSURE OF THE INVENTION

Therefore, an object of the present invention is to provide an angle-correction device and a method for doing the same which is combined with a weigh-scale device that is mountably attached to a vehicle. Another object of the present invention is to provide an angle-correction device which can be mounted in various ways on a scale, depending upon the characteristics of the scale. Still another object of the present invention is to provide an angle-correction device which may have utility in relation to scales mounted on various types of vehicles or other structures that may be positioned in an out-of-level condition. Yet another object of the present invention is to provide an angle-correction device mounted on a scale, wherein the scale is operative with a hydraulic lifting device that can dump the contents of a container while retaining the container.

Another object of the present invention is to provide an angle-correction device and method for doing the same which is in communication with the scale for determining the extent to which the scale is out of level. A further object of the present invention is to provide an angle-correction device that can determine the extent to which the scale is out of level along two axes. Yet another object of the present invention is to provide an angle-correction device that generates an electrical signal indicating the amount the scale is tilted along either one or both axes.

Another object of the present invention is to provide an angle-correction device and method for doing the same that proportionally calibrates the shear forces resulting from a load disposed on the scale in accordance with the amount of tilt detected by the angle-correction device. A further object of the present invention is to provide an angle-correction device which measures the amount of tilt of the scale and displays an error message if the amount of tilt exceeds a preselected value. Yet another object of the present invention is to provide a microcomputer-based control circuit that is electrically-operative with control mechanisms, such that the load weighed is dumped after a weight is registered by the microcomputer for later access by a host computer.

Still another object of the present invention is to provide an angle-correction device and method, as set forth above, which is legal for use in trade as defined by the United States Bureau of Weights and Measures. A further object of the present invention is to provide an angle-correction device that is accurate, can withstand wide ranges of temperature, and is durable. Yet another object of the present invention is to provide an angle-correction device and method which can accurately weigh items that have off-center weight displacement.

These and other objects and advantages of the present invention over existing prior-art forms will become more apparent and fully understood from the following description taken in conjunction with the accompanying drawings.

In general, the present invention contemplates a device for correcting the angle of a weighing scale in an out-of-level condition, including a scale for weighing a load disposed thereon and providing a weight output signal proportional thereto; a clinometer for detecting an out-of-level condition of the scale and providing at least one angle signal proportional thereto; a converter for receiving the weight output signal and the angle signal and providing an output signal proportional thereto; and a microcomputer processor for receiving the output signal, providing a visual indication of the output signal.

In general, the present invention further contemplates a method for correcting the angle of a weighing apparatus in an out-of-level condition, including the steps of providing a vehicle with a scale mounted thereon, monitoring the weight of a load disposed on the scale and generating a weight output signal proportional thereto, monitoring the angle of the scale when a load is disposed thereon and generating at least one angle signal proportional thereto, converting the weight output signal and the angle signal to an output signal proportional thereto, and displaying and storing the output signal.

PREFERRED EMBODIMENT FOR CARRYING OUT THE INVENTION

Figure 1:
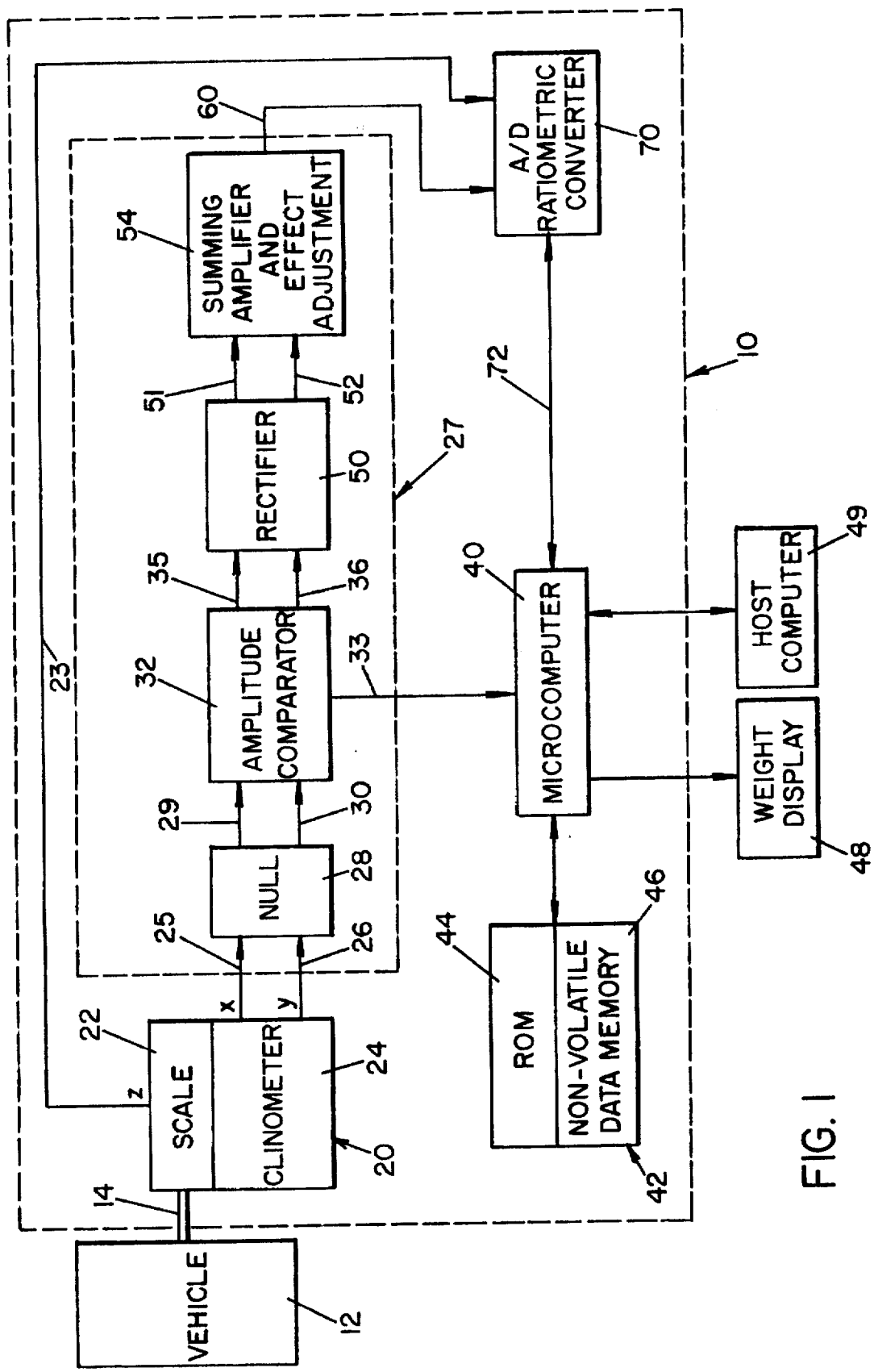
FIG. 1 is a block diagram of an exemplary device in accordance with the concept of present invention for use as an angle-correction device.

FIG. 1 depicts an angle-correction device, generally indicated by the numeral 10, which performs a method for weighing solid waste or other articles with a schematically-depicted vehicle 12 that has a lifting arm 14 which may mount a container (not shown). Angle-correction device 10 includes a weighing apparatus, generally indicated by the numeral 20, which includes a scale 22 and clinometer 24. Device 10 further includes conditioning circuitry, generally indicated by the numeral 27, a microcomputer 40, memory, generally indicated by the numeral 42, a weight display 48, a host computer 49, and a ratiometric analog-to-digital (A/D) converter 70.

The scale 22 provides a signal voltage 23, also referred to as an analog weight output signal, to the converter 70, while the clinometer 24 provides independent angle signals 25, 26 to conditioning circuitry 27. Those skilled in the art will appreciate that as a load is applied to an out-of-level oriented scale 22, an error condition develops which is represented by a reduced analog weight output signal 23 because some of the load force has a horizontal force component. To compensate for the out-of-level oriented scale 22, the conditioning circuitry 27 filters (conditions) the angle signals 25, 26 to generate a corresponding decrease in an analog angle output signal 60. The converter 70 processes the analog weight output signal 23 and the analog angle output signal 60 to generate a proportional digital output signal 72 to the microcomputer 40, which normalizes the reduced ratio to provide an accurate weight measurement of the load disposed on the scale 22. Microcomputer 40 communicates the weight measurement to the weight display 48 for viewing by the operator. The microcomputer 40 is also in communication with a host computer 49 to allow retrieval and analysis of data stored in memory 42.

In particular, vehicle 12 may be any side or rear loading waste hauling truck or recyclable material collection truck. Typically, lifting arm 14 is carried by or is pivotably mounted to vehicle 12. The lifting arm 14 may be hydraulically actuated with the necessary power and safety ratings to lift at least a 500-pound load. Of course, the lifting arm 14 could be actuated by any other comparable means and designed to handle heavier or lighter loads as necessary for a particular application.

The scale 22 and a clinometer 24 are carried on lifting arm 14 or mounted directly on the vehicle in any known manner. For example, the scale 22 could be carried on any intermediate device, such as a hopper. The lifting arm 14 could deposit the solid waste into the intermediate device, which is then weighed by the scale 22. After weighing, the intermediate device would dump the solid waste into the vehicle 12. In the preferred embodiment, the scale 22 is operative with a single tension load cell which has a capacity of up to 25,000 pounds and generates an analog weight output signal in the form of signal voltage 23. Scale 22 may be a component identified as part number 60001 supplied by Sensortronics of Corvina, Calif.

In communication with the scale 22 is the clinometer 24. As is well known in the art, a clinometer 24 is a divided-circle instrument which simplifies the transfer of angles between planes. In the preferred embodiment, a dual-axis clinometer identified as the Accu-Star II supplied by Lucas Sensing Systems of Hampton, Va. may be employed. The scale 22, in cooperation with the clinometer 24, has one axis that corresponds to the left and right of the scale 22 and another axis that corresponds to the front and back of the scale 22. As such, the left-right axis and the front-back axis are mutually perpendicular (orthogonal). It will be appreciated that when the clinometer 24 detects a one-degree tilt downward to the right, the clinometer 24 will detect a corresponding one-degree tilt upward to the left to generate angle signal 25. Of course, tilt along the front-back axis of the scale 22 provides a similar angular relationship on the clinometer 24 to generate angle signal 26. Accordingly, the clinometer 24 generates two independent angle signals 25 and 26 proportional to the deflection of each corresponding axis. It will be appreciated that the clinometer 24 could generate the independent angle signals 25 and 26 proportional to the out-of-level condition of the scale 22, directly to the convertor 70. In the preferred embodiment, the clinometer 24 is carried by the scale 22; however, it would be within the contemplation of the present invention for the clinometer 24 to be secured anywhere on the vehicle 12 so as to detect an out-of-level condition.

In operation, the clinometer 24 is electrically powered by a suitable power source, such as an eight-volt DC power source for the Accu-Star II. As such, each individual axis generates a four-volt direct current angle signal 25, 26 when the axes are in a level condition. When the clinometer 24 detects the scale 22 tilting along one of the axes, the angle signal 25, 26 therefrom changes 100 mV per one degree of tilt. For example, if the front-back axis of the clinometer 24 were to tilt two degrees forward, the corresponding angle signal 26 would be 4.2 volts. Likewise, if the front-back axis of the clinometer 24 were to tilt two degrees backward, the corresponding angle signal 26 would be 3.8 volts. The left-right axis of the clinometer 24 independently behaves in a corresponding manner to generate angle signal 25.

It will now be appreciated that the angle signals 25, 26 are received by conditioning circuitry 27. The conditioning circuitry 27 broadly includes a null circuit 28, an amplitude comparator 32, a rectifier 50, and a summing amplifier and effect adjustment circuit 54. The conditioning circuitry 27 outputs (generates) an analog angle output signal (also called a reference voltage) 60.

In particular, null circuit 28 independently receives each angle signal 25, 26 and attempts to "null" each signal to zero volts. As such, if the clinometer 24 detects a level condition along each axis,i.e., a four volt angle signal for both angle signals 25 and 26, the null circuit 28 generates corresponding tilt signals 29, 30 each equal to zero volts. However, if an out-of-level condition is detected by the clinometer 24 along either axis, the null circuit 28 generates a tilt signal 29, 30 proportional to their respective angle signal 25, 26. Continuing with the previous example, if the angle signal 26 is 3.8 volts, the null circuit 28 will generate a tilt signal 30 of negative 0.2 volt. Likewise, if the angle signal is 4.2 volts, the null circuit 28 will generate a tilt signal 30 of positive 0.2 volt. The angle signal 25 corresponding to the left-right axis is adjusted in a similar manner to generate a tilt signal 29.

Amplitude comparator 32 independently receives and compares each tilt signal 29, 30 to a preselected error level. If either one of the tilt signals 29, 30 exceeds the preselected error level, an interrupt signal 33 is generated. Otherwise, the amplitude comparator 32 passes each respective tilt signal 29, 30 therethrough without adjustment as comparator signals 35, 36, respectively. In the preferred embodiment, the preselected error level is three degrees from horizontal along either the left-right axis or the front-back axis. In other words, if the clinometer 24 detects the scale 22 tilting more than three degrees forward or more than three degrees back, the interrupt signal 33 is generated. Likewise, if the clinometer detects the scale 22 tilting more than three degrees to the right or three degrees to the left, the interrupt signal 33 is generated.

It will be appreciated that if the conditioning circuitry 27 generates an interrupt signal 33, it is received by microcomputer 40. Microcomputer 40 may be any processor capable of performing the necessary operations described hereinafter. Supporting microcomputer 40 is memory 42 which has conventional program ROM 44 and non-volatile data memory 46. The microcomputer 40 receives the interrupt signal 33 from the amplitude comparator 32 and generates an appropriate response to the out-of-level condition detected by the clinometer 24. In the preferred embodiment, when the microcomputer 40 receives an interrupt signal 33, a corresponding visual indication is displayed by the weight display 48, and the operation of the device 10 is inhibited. This visual indication allows the operator of the device 10 to know that the scale 22 is too far out of level for the device to work properly. Of course, other similar type error messages can be generated on the weight display 48.

If an out-of-level condition greater than the preselected threshold is not detected by the comparator 32, comparator signals 35, 36 are independently received by rectifier 50. The rectifier 50 effectively functions as a full-wave precision rectifier so as to generate rectified signals 51, 52 corresponding to comparator signals 35, 36, respectively. In other words, any negative voltage comparator signal 35, 36 received by the rectifier 50 is converted to a positive voltage rectified signal 51, 52 with the same absolute value as the comparator signal 35, 36 received. Referring back to the example, if the rectifier 50 receives a comparator signal 35, 36 with a negative 0.2 volt, the rectifier 50 will output (or generate) a corresponding rectified signal 51, 52 equal to positive 0.2 volt. Accordingly, a comparator signal 35, 36 with a positive voltage will also output (or generate) a rectified signal 51, 52 with a positive voltage of the magnitude introduced.

Summing amplifier and effect adjustment circuit 54 receives each rectified signal 51, 52 and processes them to generate an appropriate analog angle output signal 60 proportional thereto. Circuit 54 sums the rectified signals 51, 52 and attempts to "null" or adjust the total signal to a predetermined value compatible with converter 70, which in the preferred embodiment is one volt. In other words, circuit 54 provides an analog angle output signal 60 with a proportional voltage magnitude deviation about the predetermined value as the total signal deviates about zero volts. As such, if the clinometer 24 detects a level condition along each axis,i.e., each rectified signal voltage magnitude is equal to zero volt, the circuit 42 generates an analog angle output signal 60 whose voltage magnitude is equal to one volt.

To illustrate the operation of the circuit 54, presuming the clinometer 24 detects the scale 22 tilting only along the front-back axis two degrees, the rectified signals 51 and 52 received by the circuit 54 would equal 0.2 volt and 0.0 volt, respectively. The circuit 54 sums these two signals (51 and 52) together for a total signal voltage magnitude of 0.2 volt. Subsequently, circuit 54 attempts to null the 0.2 volt signal to 1.0 volt. In the preferred embodiment, converter 70 will proportionally compensate when the analog angle output signal 60 varies about one volt in one ten-thousandths volt increments. Thus, in this instance, circuit 54 divides the 0.2 volt signal by 100 and subtracts it from 1.000 volt, yielding a value of 0.998 volt, which is designated as the analog angle output signal 60. Those skilled in the art will appreciate that the null circuit 28, amplitude comparator 32, rectifier 50, and summing amplifier and effect adjustment circuit 54 collectively condition and manipulate the independent angle signals 25, 26 provided by the clinometer 24 so as to generate a corresponding analog angle output signal 60. Of course, the voltage values presented in the preceding examples can be adjusted to be compatible with the outputs of the weighing apparatus 20.

The analog weight output signal 23 and the analog angle output signal 60 are received by the A/D ratiometric converter 70, which ratiometrically compares the analog weight output signal 23 to the analog angle output signal 60 so as to generate a digital output signal 72. Those skilled in the art will appreciate that for the purposes of the converter 70, the analog weight output signal 23 is employed as the signal voltage and that the analog angle output signal 60 is employed as the reference voltage. A TSC800 15-bit plus sign integrating A/D converter commercially available from Teledyne Semiconductor of Mountain View, Calif. has been found to be suitable for utilization as converter 70.

In general, converter 70 converts the analog weight output signal 23 from scale 22 to a corresponding digital value, adjusting this digital value in proportion to the extent of out-of-level condition measured by clinometer 24, as reflected by analog angle output signal 60. Electrically converter 70 operates as a conventional, dual-slope, integrating analog-to-digital converter having two distinct phases of operation.

In the first phase, converter 70 counts pulses of constant duration for a period of time controlled by the voltage magnitude of the chosen analog input signal, in the present instance the analog weight output signal 23. Since this process amounts to integration of the analog input signal, this phase is referred to as the integration phase. The pulse count is a digital value proportional to the weight measured by scale 22.

In the second phase, converter 70 decrements the pulse count found during the integration phase by the number of constant duration pulses that occur during a time period proportional to the voltage magnitude of the analog angle output signal 60 and, therefore, proportional to the magnitude of any out-of-level condition. In this exemplary manner, a digital output signal 72 may be generated accurately representing the actual weight of the load disposed on the scale 22.

The microcomputer 40 processes the digital output signal 72 into a form acceptable for visual display on weight display 48. Furthermore, the microcomputer 40 stores the digital output signal 72 and identifying information related to the container holding the load into the memory 46 for later retrieval and analysis by the host computer 49. The host computer 49 is capable of gathering statistics and recognizing trends for billing or other purposes by the waste-hauling operators.

Those skilled in the art will appreciate that as a load is applied to a scale 22 in an out-of-level condition, less analog weight output signal 23 develops because some of the load force is horizontally directed. Concurrently, the required conditioning of the angle signals 25, 26 through null circuit 28, amplitude comparator 32, rectifier 50, and summing amplifier and effect adjustment circuit 54, allows the weighing apparatus 20 to provide a corresponding decrease in the analog angle output signal 60 to the converter 70. Therefore, the converter 70 continues to provide an accurate weight reading of the load disposed on the scale 22 on the weight display 48.

Figure 2:
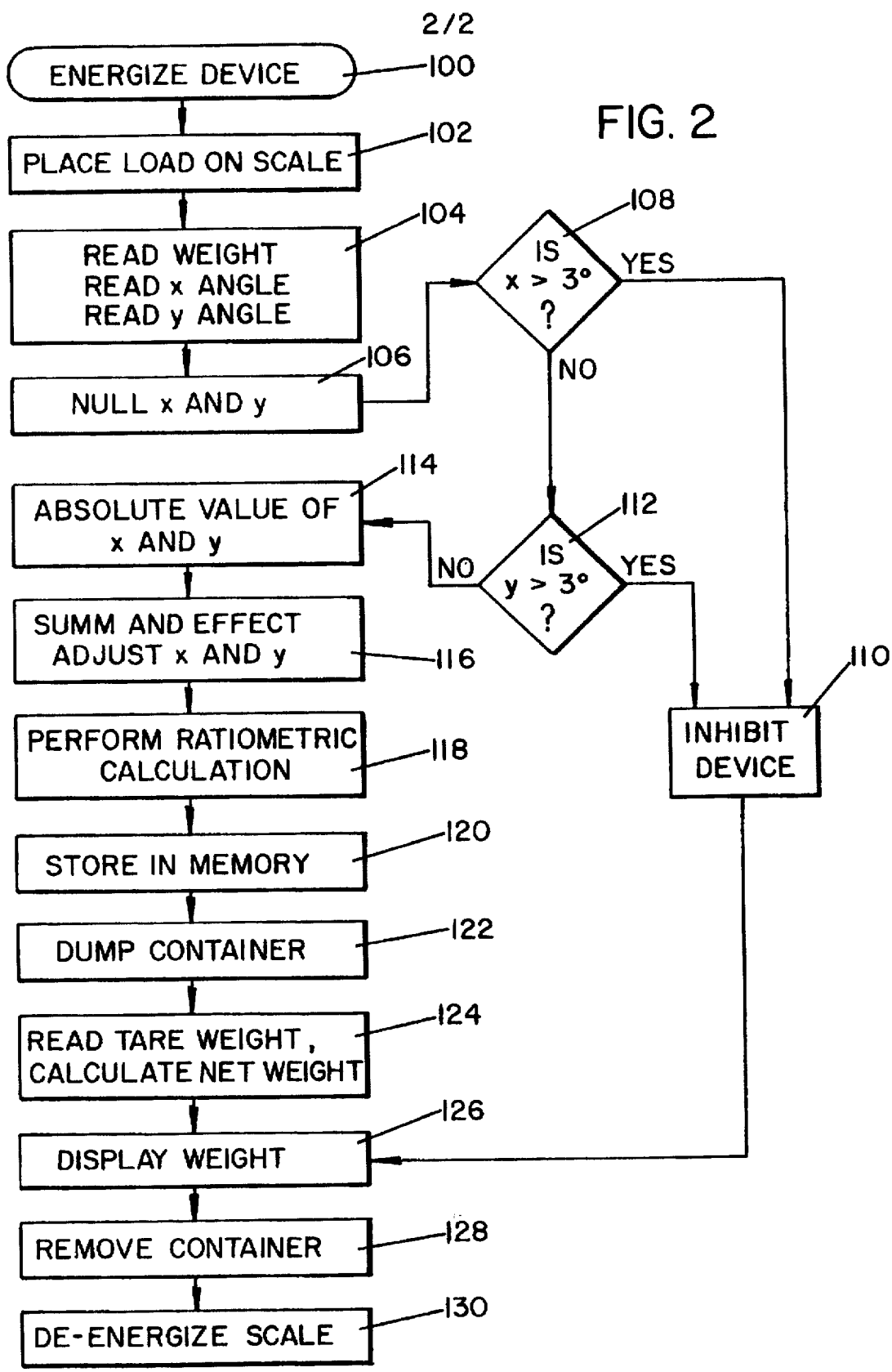
FIG. 2 is a top-level flowchart depicting the operation of the device.

Turning to the flowchart presented in FIG. 2, operation of angle-correction device 10 can be seen to begin in step 100 with the energizing of device 10, which includes powering the necessary circuitry and hydraulics as required. Thereafter, the operator of the vehicle 12 places the load to be weighed on the scale 22 in step 102. Of course, it is within the scope of this method that the scale 22 and clinometer 24 are carried by the lifting arm 14 or by any intermediate device between the lifting arm 14 and the vehicle 12. After preliminarily lifting the load off the ground, the device 10 in step 104 reads the vertical weight forces of the load and generates a corresponding analog weight output signal 23. Additionally, in step 104, the clinometer 24 reads the amount of tilt that the scale 22 incurs during the weighing operation and generates an angle signal 25, 26 for each of the preselected axes (designated as x and y, respectively).

Next, the null circuit 28 in step 106 attempts to independently "null" each angle signal 25, 26 to zero volt to generate independent tilt signals 29, 30, respectively. In step 108, the amplitude comparator 32 determines whether the front-back axis (designated as x) is tilted more than three degrees out of level. If the front-back axis is out of level, an interrupt signal 33 is directed to microcomputer 40. Thereafter, in step 110 the microcomputer 40 inhibits device 10 and sends an error message to the weight display 48. However, if the front-back axis is within the preselected parameter, the flowchart will continue to step 112 to determine if the left-right axis (designated as y) is tilted more than three degrees out of level. If an out-of-level condition exists, an interrupt signal 33 is directed to microcomputer 40.

Thereafter, in step 110, the microcomputer 40 inhibits device 10 and sends an error message to the weight display 48.

Once it is determined that the weighing apparatus 20 is within an acceptable operating range, the voltages assigned to x and y are converted into their absolute value form at step 114 by the rectifier 50. Thereafter, at step 116, the summing amplifier and effect adjustment circuit 54 adds x and y together and then attempts to "null" the result to 1.0 volt, which is referred to as the analog angle output signal or reference voltage 60. At step 118, the A/D ratiometric converter 70 receives analog weight signal 23 and analog angle output signal 60 and generates a digital output signal 72 proportional thereto. Thereafter, at step 120 the digital output signal 72 or gross weight is stored by the microcomputer 40 in the non-volatile data memory 46.

Next, at step 122 the container holding the load disposed on the scale 22 is lifted by the arm 14 and dumped into the vehicle 12. As mentioned earlier, the load may be disposed on an intermediate device for weighing, such that the load is dumped from the intermediate device into the vehicle 12. Afterwards, at step 124 the tare weight of the container is measured and subtracted from the gross weight by the microcomputer 40, such that a net weight can be visually displayed on the weight display 48 at step 126. Of course, if an error message to inhibit the device 10 is sent from step 110, the weight display 48 will so indicate at step 126. Thereafter, at step 128 the container is removed or released and subsequently the scale 22 is de-energized at step 130.

Inasmuch as the present invention is subject to variations, modifications, and changes in detail, some of which have been expressly stated herein, it is intended that all matter described throughout this entire specification or shown in the accompanying drawings be interpreted as illustrative and not in a limiting sense. It should be evident that a device constructed and method performed according to the concept of the present invention, and reasonably equivalent thereto, will accomplish the objects of the present invention and substantially improve the art of weighing scales subject to an out-of-level condition.

What is claimed is:

1. Weighing apparatus having a device for correcting an error introduced in the weighing operation by an out-of-level condition, comprising:

scale means for weighing a load disposed thereon and providing a weight output signal proportional thereto;

dual-axis clinometer means for detecting an out-of-level condition of said scale means and providing at least a first and a second angle signal respectively proportional to the out-of-level condition;

conditioning means for receiving said first and second angle signals and generating a compensated angle output signal that is derived from a non-trigonometric function, wherein said conditioning means includes null means for receiving said first and second angle signals and generating corresponding first and second tilt signals, comparator means for receiving said first and second tilt signals, comparing said first and second tilt signals to a preselected error level, and generating an interrupt signal when either of said first and second tilt signals exceeds said preselected error level and generating first and second comparator signals whenever said first and second tilt signals are within said preselected error level, rectifier means for receiving said first and second comparator signals, converting said first and second comparator signals to their respective absolute values, and generating corresponding first and second rectified signals, and summation and adjustment means for summing said first and second rectified signals to each other to generate said compensated angle output signal;

converter means for receiving said weight output signal and said compensated angle output signal wherein any out-of-level tilt imparted to said scale means causes a corresponding reduction in said weight output signal and a corresponding decrease in a nominal value of said compensated angle output signal, and wherein said converter means employs a ratio of said weight output signal to said compensated angle output signal to generate said output signal; and processor means for receiving said output signal and providing a visual indication of said output signal.

2. A device as set forth in claim 1, wherein said clinometer means is carried by said scale means.

3. A device as set forth in claim 1, wherein said scale means is carried by a vehicle.

4. A device as set forth in claim 3 further including means for lifting, wherein said scale means is operative with said lifting means such that said load is transferable from said scale means to said vehicle.

5. A device as set forth in claim 1, wherein said dual-axis clinometer means has a first axis mutually perpendicular to a second axis, said dual-axis clinometer means generating:

a first angle signal proportional to the out-of-level condition of said scale means along said first axis; and a second angle signal proportional to the out-of-level condition of said scale means along said second axis.

6. A device as set forth in claim 5, wherein said preselected error level is three degrees from horizontal.

7. A method for correcting an error introduced by operation of a weighing apparatus in an out-of-level condition, comprising the steps of:

providing a vehicle with means for mounting a scale thereon;

positioning a load on said scale;

monitoring the weight of a load disposed on said scale and generating a weight output signal proportional thereto, wherein said weight output signal is less than a nominal value in the out-of-level condition;

monitoring the angle of said scale when a load is disposed thereon and generating at least two angle signals proportional thereto;

conditioning said angle signals and providing a compensated angle output signal that is derived from a non-trigonometric function, wherein said compensated angle output signal is reduced from a nominal value in the out-of-level condition;

converting said weight output signal and said compensated angle output signal to an output signal by employing a ratio of said weight output signal to said angle output signal to generate a normalized value of the weight represented by said output signal; and displaying and storing said output signal.

8. A method as set forth in claim 7, wherein said step of monitoring the angle of said scale includes the steps of:

providing a first angle signal proportional to an out-of-level condition of said scale along a first axis; and providing a second angle signal proportional to an out-of-level condition of said scale along a second axis which is orthogonal to said first axis.

9. A method as set forth in claim 8, wherein said step of conditioning said angle signal includes the steps of:

receiving said first and second angle signals and generating corresponding first and second tilt signals;

comparing said first and second tilt signals to a preselected error level and generating an interrupt signal when either of said first and second tilt signals exceeds said preselected error level and generating first and second comparator signals when said first and second tilt signals are within said preselected error level;

rectifying said first and second comparator signals to their respective first and second absolute values and generating corresponding first and second rectified signals; and summing said first and second rectified signals and adjusting the summed first and second rectified signals from the nominal value to generate said angle output signal.

10. A method as set forth in claim 9, wherein said step of converting includes the step of integrating said weight output signal in a first phase and integrating said compensated angle output signal in a second phase to generate a corresponding output signal.

11. A method as set forth in claim 10, wherein said step of comparing further includes the step of setting preselected error level three degrees from horizontal.

12. A method as set forth in claim 11, further including the steps of:

processing either said interrupt signal or said output signal; and displaying visually one of said interrupt signal and said digital output signal.

13. Weighing apparatus having a device for correcting an error introduced in the weighing operation by an out-of-level condition, comprising:

scale means for weighing a load disposed thereon and providing a weight output signal proportional thereto;

clinometer means for detecting an out-of-level condition of said scale means and providing at least one angle signal proportional thereto;

conditioning means for receiving said angle signal and generating a compensated angle output signal;

converter means for receiving said weight output signal and said compensated angle signal and generating an output signal proportional thereto; and processor means for receiving said output signal and providing a visual indication of said output signal.

14. The device as set forth in claim 13, wherein any out-of-level tilt imparted to said scale means causes a corresponding reduction in said weight output signal and a corresponding decrease in a nominal value of said compensated angle output signal, and wherein said converter means employs a ratio of said weight output signal to said compensated angle output signal to generate said output signal.

15. The device as set forth in claim 14, wherein said clinometer means provides two angle signals proportional to the out-of-level condition and wherein said converter means integrates said weight output signal in a first phase by counting pulses for a period of time controlled by a magnitude value of said weight output signal and decrements the pulse count by a number of constant duration pulses that occur in a time period proportional to a magnitude value of said compensated angle output signal to generate said output signal.

16. The device according to claim 13, wherein said conditioning means generates said compensated angle output signal from a non-trigonometric function.

* * * * *